Oct. 18, 1955  P. WORMSER  2,720,989
FREIGHT HANDLING TRUCK
Filed Feb. 24, 1953  2 Sheets-Sheet 1

INVENTOR:
Paul Wormser
By Herbert E. Metcalf
His Patent Attorney

Oct. 18, 1955　　　　　P. WORMSER　　　　　2,720,989
FREIGHT HANDLING TRUCK
Filed Feb. 24, 1953　　　　　　　　　　　2 Sheets-Sheet 2
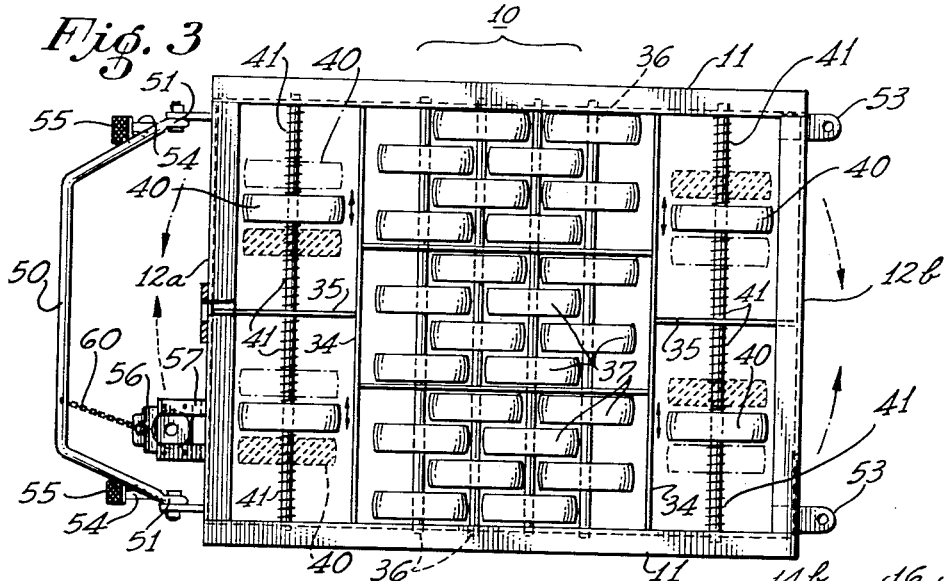
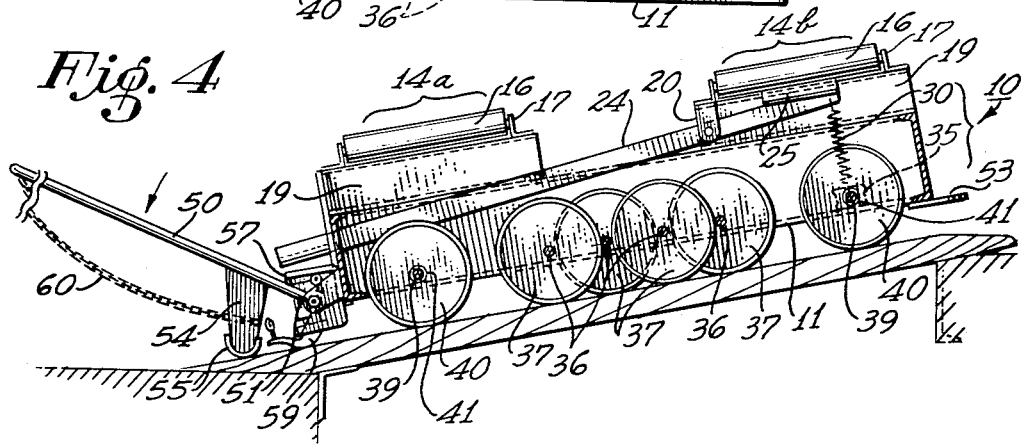
INVENTOR:
Paul Wormser
By　Hubert E. Metcalf
His Patent Attorney United States Patent Office 2,720,989
Patented Oct. 18, 1955

2,720,989

FREIGHT HANDLING TRUCK

Paul Wormser, San Francisco, Calif.

Application February 24, 1953, Serial No. 338,449

5 Claims. (Cl. 214—84)

My invention relates broadly to vehicles, and more particularly to a new and novel hand truck for the handling of freight.

Much of the handling of freight in freight transport must be accomplished over surfaces which are far from ideal, such as for example the slatted floors of railway cars, motor truck beds, loading dock floors, inclined ramps, etc., which are often badly splintered and uneven.

The safety of the teamsters who handle freight should be given the same serious considerations which is usually accorded the speed and efficiency with which freight is handled. With these factors in mind, and others which will be brought to light in the ensuing specification, it is one of the objects of my invention to provide a freight handling truck which can be pivoted and easily maneuvered by movement in any direction over rough uneven surfaces while loaded.

Another object of my invention is to provide a hand powered truck with which freight can be handled and transported over rough floors with a relatively high degree of safety.

Another object of my invention is to provide a hand truck of the transfer type upon which a load of freight can be stabilized even though the ground or floor upon which the freight rests is subject to change with respect to level, e. g., motor truck beds, inclined ramps, etc.

A further object of the invention is to provide a hand truck of the transfer type upon which the freight can be loaded by sliding over rollers for example, and brought to rest in a substantially stable position on the truck even though the truck is not resting on a perfectly level floor or ground.

Still another object of my invention is to provide a hand truck for handling freight which can be relatively safely controlled by the operator on inclined floors or surfaces.

Other objects, advantages, and novel features of the freight truck of my invention will be seen as the specification thereof continues.

In summary, the freight handling truck of the present invention, in one preferred embodiment thereof, comprises a horizontal chassis or underframe, of the size and weight desired, having a central arrangement of floor supported rollers, or wheels, whichever is preferred, disposed so as to support and carry the major portion of a freight load. Adjacent each corner of the underframe separate pivot wheels are provided, each having sufficient side or end play, along their axes, so that the truck can be turned and maneuvered in any desired direction. Atop the under frame, movable conveyor aprons are provided so that freight can be easily slid on and off the truck from either side thereof; movement of this apron being controllable by the truck operator. Pivoted at one end of the truck, a novel operating lever is provided; being angularly movable over an arc on its pivot from a position normal to the horizontal plane of the truck underframe to a position substantially parallel with the ground. Means is provided on the truck operating lever, and manually operable in accordance with movement thereof, to control the truck on inclined surfaces or floors. Other features and principles of my invention, together with the novel construction thereof, will be more clearly understood by reference to the ensuing detailed description and drawings wherein:

Figure 3 is a diagrammatic plan view, as seen from above, of the underframe of the truck of the previous figures; the roller transfer aprons being purposely omitted for the sake of clarity.

Figure 4 is a diagrammatic side elevational view, partly in section, of the truck of the previous figures, demonstrating the operation of the braking devices on an inclined surface.

Figure 1:
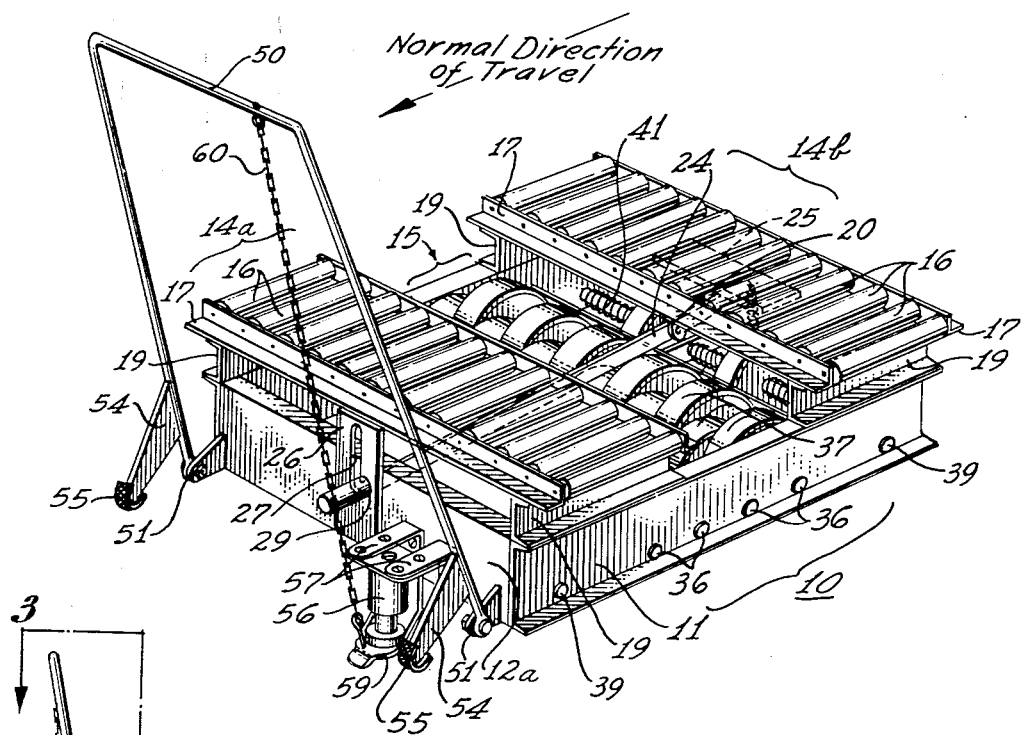
Figure 1 is a three-quarter view in perspective showing one preferred form of the truck of my invention as seen from above.
Figure 2:
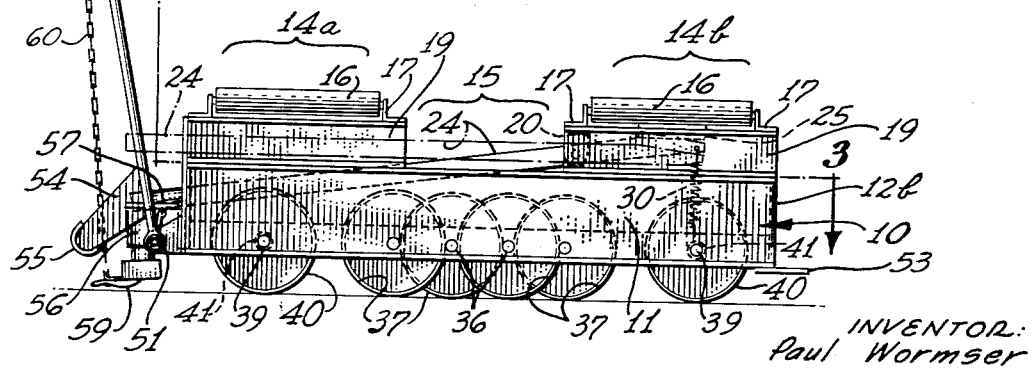
Figure 2 is a side elevational view of the truck of Figure 1, diagrammatically showing structural details of certain components of the truck assembly.

In Figures 1 and 2, I show a complete view of the freight truck, which in the present exemplary form comprises a generally orthogonal horizontal underframe 10 constructed preferably of parallel outwardly flanged side 11 and parallel end 12 frame members joined or fastened together in any convenient manner. Atop the underframe 10, roller type transfer aprons 14a and 14b are mounted at each end thereof. In dividing the transfer apron into two sections positioned as shown, a space 15 is provided therebetween to admit the lifting prongs of a fork truck, or the lifting hooks of cranes, when such means of loading and unloading freight is employed.

Each transfer apron 14a and 14b employs a number of parallel rollers 16 uniformly spaced and positioned in line, and journaled at each end thereof in angle support members 17 which in turn are fastened on intermediate supports 19 which are fastened to the underframe side members 12 in any convenient manner. All the rollers 16 are, as shown, rotatable in the same direction, which direction is preferably transversely of the longitudinal axis of the truck, i. e. the normal direction of travel of the truck. In actual operation the truck is normally loaded or unloaded from the side of truck; the truck being rolled alongside freight to be loaded or transferred thereon. In loading, the freight is usually elevated to a plane parallel with the transfer aprons 14a and 14b in any convenient manner, such as by a lift truck, or transferred from a gravity type conveyor; being slid thereon over the rollers 16 of the transfer aprons. It is noteworthy to here mention that freight is usually conveniently loaded on wooden platforms or pallets beforehand so that each part and parcel thereof need not be individually handled; the freight remaining on the pallets through most of the transport operations as is well known in the art.

To stabilize the freight load on the truck, I provide a novel yet simple means for immobilizing or braking at least a portion of the transfer apron rollers 16. As shown in Figures 1, 2, and 4, a U-shaped clevis 20 is attached to the inner angle support 17 of the rear transfer apron 14b. Between the lugs of the clevis 20, an elongated lever bar 24 is pin-connected adjacent the rear end thereof to provide a leverage fulcrum therefor. The rearward end of the lever 24 is scarfed at a slight angle and has a flat rectangular brake block 25 mounted thereon, such as by welding for example, with the horizontal plane of the block 25 opposing the underside of a number of the rollers 16. The contact surface of the brake block 25 can be covered, if desired, with a pad of friction material such as neoprene rubber, to provide a more positive braking surface for the rollers 16.

At the forward end of the truck and on the underframe end member 12, a slotted plate 26 is vertically mounted, the elongated slot 27 in the plate being arranged vertically, having a lateral detent 29 at the lower end thereof so that the forward end of the brake lever 24, which is extended therethrough as shown, can be locked in the downward or braked position to hold the brake block 25 in contact with the transfer apron rollers 16 to prevent rotation thereof so that freight will be prevented from rolling off the truck. When the brake lever 24 is released from the lateral slot detent 29 just described, a tension spring 30, which is secured at one end thereof to the underside of the brake lever 24, or brake block 25, and the other end thereof being connected to a portion of the underframe 10 structure, will hold the brake block 25 away from the rollers 16 as shown.

The wheel arrangement of the truck will next be described. Referring to Figure 3, the center of the underframe is bolstered by lateral braces 34 which braces are in turn braced by stringers 35 extending longitudinally of the underframe 10. A number of axles 36 are spaced parallel of each other and transversely of the longitudinal axis of the truck frame; the axles 36 being journaled at each end thereof in the underframe side members 11 in the usual manner. The axles 36 are equipped with a number of relatively wide wheels 37 of uniform size and preferably rubber tired. In the central arrangement, the wheels 37 of one axle 36 are closely spaced together and alternately nested with the wheels of adjacent axles so as to provide a compact group of interlaced wheels in the center of the underframe 10, and covering a relatively large area of the surface or floor upon which the truck rests. In this manner, the major portion of the freight load is supported and carried by this central arrangement of wheels, as was described earlier in the specification, to enable the truck to easily travel over rough uneven surfaces; reducing the possibility of wheels jamming in cracks and splintered areas of floors. The centrally positioned axles 36 are, as shown above, preferably spaced apart by distances slightly greater than the radius of the wheels 37 mounted thereon.

Adjacent each end member 12 of the truck underframe 10, end axles 39 are journaled in the frame side members 11, in the same manner as the central axles 36, and provided with pivot wheels 40 of the same size as those of the central wheel arrangement. Each pivot wheel 40 is normally positioned approximately midway between the center of the underframe 10 and the respective side member 11 thereof during regular travel. Each wheel 40 is freely movable in either lateral direction along the axis of the axle 39 against a coil spring 41 encircling the axle 39 on each side of the wheel 40. The coil springs 41 permit the end play of the pivot wheels 40 during turning and maneuvering of the truck around the central group of wheels which will permit such pivoting because of their cenrtally clustered arrangement as indicated in Figure 3 by the dotted arrows, and tend to return the wheels 40 to normal, or centered position, when the truck resumes normal direction of movement.

At the forward end of the truck underframe 10, a rigid draw handle 50 is attached, being preferably made of metal rod stock bent into generally wide angled U form as shown. Each end 51 of the draw handle 50 is suitably formed in the usual manner for connection to pivot bearings 52 provided adjacent each corner of forward underframe end member 12a. The pivot bearing bolts can be made as tight as desired to arrest the handle 50 in arrested position to prevent its dropping to the floor when released by the oprator. As shown, additional bored lugs 53 can be provided on the rearward end member 12b to provide convenient means for maneuvering the truck from that end by means of draw bars or hooks (not shown) as will be seen by those skilled in the art.

Adjacent and forwardly of each end 51 of the draw handle 50, a generally rectangular plate 54 is mounted to the underside of the draw handle 50; being firmly attached in any convenient manner, such as by welding for example. The lower end of each plate 54 is preferably arcuately formed, or rounded, and is provided with an arcuate friction pad 55 of a strong material, such as metal or rubber, which when brought into contact with the floor by downward movement of the draw handle 54 will act as a brake for the truck. If metal is used for the pad 55, the underside thereof can be roughed, or knurled, to provide a better friction surface. Operation of the draw handle brake is, as briefly described above, accomplished by the operator by manual movement of the draw handle 50 toward the floor. The operator can thus exert the amount of pressure necessary for stopping the truck, such as on an inclined surface, and can generally keep the truck safely under control by properly adjusting his weight on the handle 50.

For parking the truck during loading and unloading thereof, or on inclined surfaces, I provide a foot-operated braking device 56; a widely known make is selected for illustration. The parking brake 56 is mounted by means of brackets 57 to the forward underframe end member 12a within easy reach of the operator. The particular braking device 56 illustrated is of the type wherein a spring and universal joint (not shown) maintain a friction surface 59 in flat firm contact with substantially any type of floor or surface when actuated and locked by foot pressure. A light chain 60, or cord, can be attached to the draw handle 50 at one end thereof; the other end being fastened to the brake 56 for conveniently releasing of the brake by hand.

It can thus be seen that the novel freight handling truck of my invention embodies a number of significant features and advantages which will increase the safety of freight handling, and at the same time greatly reduce manual labor in connection therewith. Greater maneuverability, easier travel over rough uneven surfaces, and greater control of the truck on inclined floors and ramps will speed up loading and unloading of freight and result in considerable reduction of handling costs.

While I have shown the transfer aprons of the truck divided into two separate sections 14a and 14b, with a space 15 therebetween, it will be obvious that in certain cases, a unitary transfer apron using longer rollers and extending over the entire truck frame 10 will be desirable, and I therefore do not choose to limit the transfer aprons of the truck of my invention to the specific arrangement shown herein. Moreover, the draw handle can assume other shapes than the particular shape illustrated herein without departing from the spirit of the invention.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A freight handling vehicle having in combination a horizontal frame comprising parallel side members and parallel end members, a plurality of axles spaced centrally in said frame and journalled between said side members, a plurality of ground supported wheels rotatably mounted on said axles, said wheels being alternately spaced with wheels on adjacent axles to define an interlaced group of wheels for supporting a major portion of a load placed on said frame thereover, an axle spaced from said central group of axles and positioned adjacent each end member and journalled between said side members, ground supported pivot wheels rotatably mounted on said end positioned axles, said pivot wheels being positioned inwardly from said side members toward the center of said frame and movable along the extent of said axles in either direction, coil springs encircling said end axles on either side of said pivot wheels to maintain said pivot wheels in position during normal travel of said vehicle, transfer aprons mounted over said frame and comprising a plurality of rollers parallelly spaced in series and all rotatable in the same direction transversely of said side members so that freight can be slid thereover onto said frame and supported thereon, a lever brake mounted between said frame and the underside of said rollers and movable from a position in contact with at least a portion of said rollers to prevent rotation thereof to a position out of contact with said rollers, said lever brake being manually operable from one end of said frame, an operating handle pivotally attached at one end of said frame and manually movable between a position at right angles to said frame and a position substantially parallel with the ground, braking means associated with said operating handle and movable from a position in firm contact with the ground to a position out of contact with the ground in accordance with movement of said handle, and manual pressure operated means also mounted on said end member for anchoring said vehicle in a parked position.

2. A freight handling vehicle having in combination: a horizontal frame comprising parallel side members and parallel end members, ground supported wheels journalled and arranged centrally in said frame to support a load over said frame, ground supported pivot wheels also journalled in said frame and positioned adjacent each corner of said frame midway between the center thereof and the side members and movable along their axes against springs mounted on either side thereof to permit said frame to be pivoted around said central wheel arrangement, transfer aprons mounted over said frame and comprising rows of rollers all rotatable laterally of the longitudinal axis of said vehicle frame so that freight can be slid thereover onto said frame from either side thereof, means defining an access space centrally of said transfer aprons to admit lifting devices beneath freight supported on said transfer aprons, means manually controllable from one end of said frame to immobilize at least a portion of said transfer apron rollers, an operating lever mounted at one end of said frame and manually movable between a position perpendicular to the ground and a position substantially parallel with the ground, brake members associated for operation by said operating lever, said brake members being adapted to contact the ground to impart drag on said vehicle in accordance with proper manual movement of said operating lever, and an anchor brake for parking said vehicle in an arrested position on the ground.

3. A freight handling vehicle of the character described having in combination a horizontal frame comprising parallel end members and parallel side members, one of said end members being designated as the forward end of said vehicle, ground supported wheels journalled in said frame between said side members, a first portion of said ground supported wheels being centrally grouped and arranged in said frame to support and carry the major portion of a load over said frame, a second portion of said wheels being positioned adjacent each corner of said frame and having sufficient end play along their axles to permit said frame to be pivoted around said first portion of wheels in either direction, spring means positioned on either side of said second portion of wheels to reposition said wheels after pivoting of said frame and resumption of normal travel thereof, a transfer apron mounted over each end of said frame, each of said transfer aprons comprising rows of parallel rollers extending transversely of said side members and journalled for rotation in the same direction, a space defined centrally of said frame between said transfer aprons, a lever brake comprising a brake block opposing the underside of at least a portion of said transfer apron rollers, a lever attached to said brake block at one end thereof, the other end of said lever extending to the forward end of said frame for manual operation thereof to move said brake block into contact with the underside of said rollers to prevent rotation thereof, and for operation thereof to move said brake block out of contact with said rollers to permit rotation thereof, a spring connected between said brake block and said frame to hold said brake block away from said rollers when said lever is in released position, a U shaped operating handle mounted to the forward end of said vehicle, said operating handle being pivotally mounted for manual movement toward the ground and away from the ground, brake elements mounted on each leg of said handle adjacent each end thereof and extending toward said ground, friction pads mounted on the ends of said brake elements, whereby when said handle is moved downwardly toward the ground said friction pads are brought into contact therewith to impart drag on said vehicle, and a parking brake for said vehicle.

4. A freight handling vehicle having in combination: a horizontal frame comprising parallel side members and parallel end members, ground supported wheels journalled and arranged centrally in said frame to support a load over said frame, ground supported pivot wheels also journalled in said frame and positioned adjacent each corner of said frame midway between the center thereof and the side members and movable along their axes against springs mounted on either side thereof to permit said frame to be pivoted around said central wheel arrangement, transfer aprons mounted over said frame and comprising rows of rollers all rotatable in the same direction and positioned so that freight can be slid thereover onto said frame from either side thereof, means manually controllable from one end of said frame to immobilize at least a portion of said rollers, a substantially U shaped operating lever, the two ends of said lever being pivotally connected to the end members of said frame, brake members mounted to said operating lever, said brake members comprising substantially rectangular plates, one being mounted on each leg of said operating lever adjacent one end thereof and extending therefrom toward the ground and substantially perpendicular thereto when said operating lever is pivoted to a position nearly parallel with the ground, and a friction pad mounted on the ground contact position of each brake to impart drag on said vehicle when said operating lever is pivoted toward the ground.

5. A freight handling vehicle having in combination: a horizontal frame comprising parallel side members and parallel end members, ground supported wheels journalled and arranged centrally in said frame to support a load over said frame, ground supported pivot wheels also journalled in said frame and positioned adjacent each corner of said frame midway between the center thereof and the side members and movable along their axes against springs mounted on either side thereof to permit said frame to be pivoted around said central wheel arrangement, transfer aprons comprising a first row of rollers positioned at one end of said frame, said rollers being journalled at each end thereof for rotation in the same direction and positioned parallel of each other in line, and a second row of rollers at the other end of said frame, said rollers being journalled at each end thereof for rotation in the same direction and positioned parallel of each other in line, wherein a space is defined between said first and second row of rollers to provide an operating space to facilitate loading and unloading of freight from either side of said vehicle, an operating lever mounted at one end of said frame and manually movable between a position substantially perpendicular to the ground and a position substantially parallel with the ground, brake members associated for operation by said operating lever, said brake members being adapted to contact the ground to impart drag on said vehicle in accordance with proper manual movement of said operating lever, and an anchor brake for parking said vehicle in an arrested position on the ground.

References Cited in the file of this patent

UNITED STATES PATENTS

| | | |
|---|---|---|
| 171,367 | Estes | Dec. 21, 1875 |
| 468,559 | Chatfield | Feb. 9, 1892 |
| 954,993 | Peters | Apr. 12, 1910 |
| 1,270,383 | Crawford | June 25, 1918 |
| 2,209,581 | Remsen | July 30, 1940 |
| 2,548,054 | Pinto | Apr. 10, 1951 |
| 2,557,203 | Rehberger | June 19, 1951 |
| 2,584,240 | Stewart | Feb. 5, 1952 |
| 2,633,260 | Sutherland | Mar. 31, 1953 |

FOREIGN PATENTS

| | | |
|---|---|---|
| 18,909 | Great Britain | Sept. 5, 1898 |
| 898,358 | France | July 3, 1944 |